Nov. 24, 1942.  M. L. SWIRE  2,303,006
COPYING ATTACHMENT
Filed Jan. 9, 1941  2 Sheets-Sheet 2

Inventor
Morris L. Swire,
By Stanley Burch
Attorney

Patented Nov. 24, 1942

2,303,006

UNITED STATES PATENT OFFICE 2,303,006

COPYING ATTACHMENT

Morris L. Swire, Utica, N. Y., assignor to Effie G. Swire, Utica, N. Y.

Application January 9, 1941, Serial No. 373,849

2 Claims. (Cl. 90—13.2)

This invention relates to a copying attachment for planing, shaping, grinding and like machines, and has more particular reference to an attachment of this kind in which a rotary cutter is guided in its work path by a tracer point directed by a master model or pattern.

The primary object of the present invention is to provide an attachment of the above kind which is extremely simple and durable in construction, readily attachable to the desired machine, highly efficient in use, and otherwise well adapted to meet with the requirement for a successful commercial use.

Other objects and features of the present invention will become apparent from the following description, when considered in connection with the accompanying drawings, in which:

Figure 3 is a transverse section on line 3—3 of Figure 1; and

Figure 1:
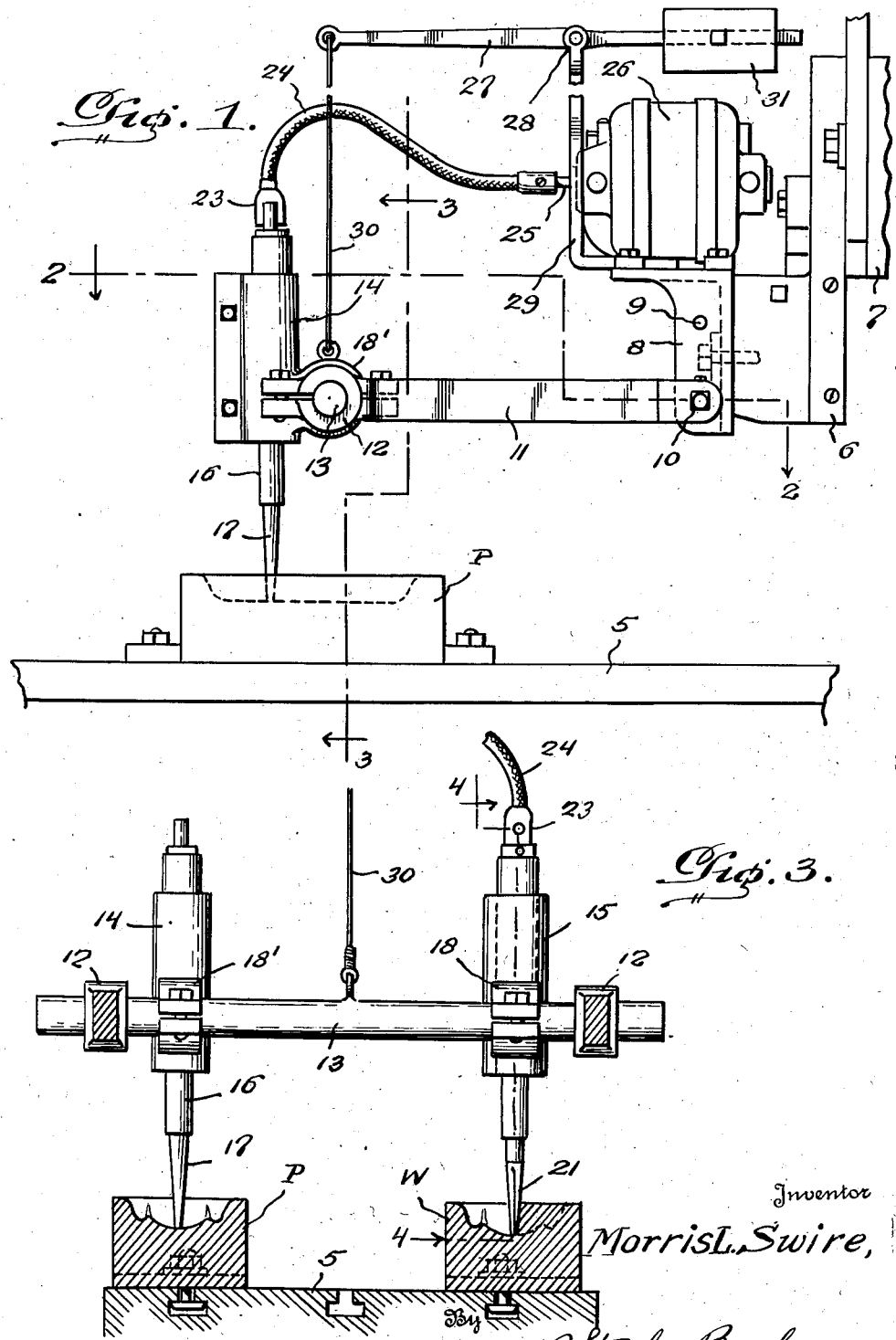
Figure 1 is a fragmentary side elevational view, partly broken away, illustrating an embodiment of the present invention applied to a metal planing machine.
Figure 2:
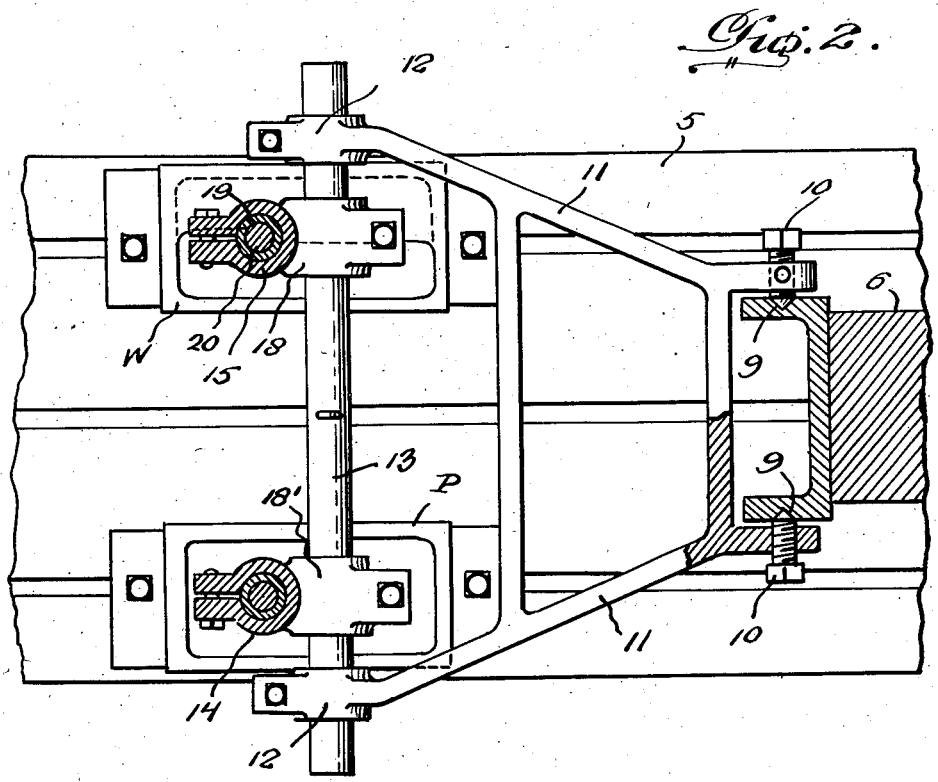
Figure 2 is a horizontal section on line 2—2 of Figure 1.
Figure 4:
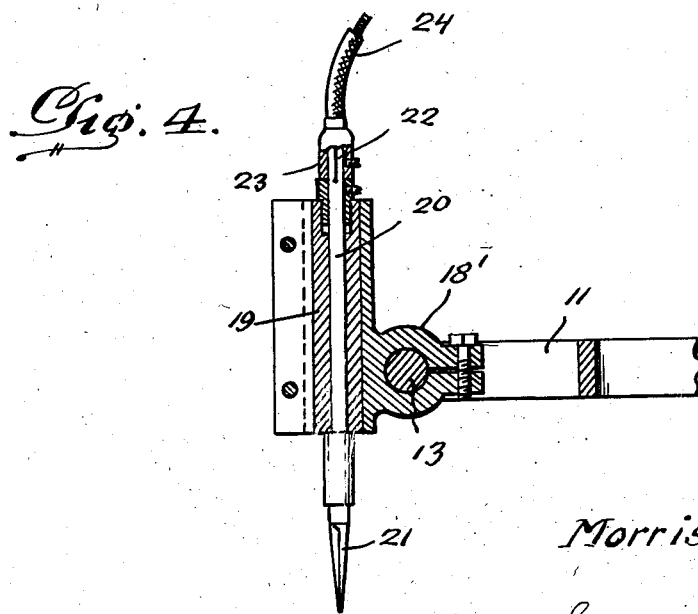
Figure 4 is a fragmentary section on line 4—4 of Figure 3.

In the drawings, 5 indicates the usual work table of a planing machine, to which horizontal reciprocating movement is imparted by the ordinary means. The planing machine further includes the usual tool support 6 carried by a tool head 7 which is ordinarily transversely or horizontally movable in a rail vertically movable on columns, not shown. Also, the usual vertical-transverse feed (not shown) is provided for setting the rail with its tool head at the desired height above the work table and for feeding the tool head transversely of the work table.

The present attachment includes a motor support 8 in the form of a shelf bracket adapted to be attached to a support such as the tool support 6 or the tool bar of a milling machine or the like. The motor support 8 has side flanges formed with conical bearing recesses 9 receiving the conical end of bearing screws 10 of a frame 11 so as to mount the latter for free vertical swinging movement. This frame 11 includes spaced rigidly connected arms having parallel rear end portions through which the bearing screws 10 are threaded, and having forwardly diverging end portions terminating at their forward ends in split transversely alined clamps 12. The clamps 12 receive and grip the ends of a transverse bar 13 on which are mounted spaced heads 14 and 15. The head 14 includes a vertical clamping sleeve in which is gripped a holder 16 carrying a tracer point or stylus 17. This vertical clamping sleeve has an attached split clamp 18 embracing and gripping the tool bar 13. The head 15 also includes a vertical clamping sleeve having an attached split clamp 18' embracing and gripping the tool bar 13. In addition, the vertical clamping sleeve of head 15 receives and grips a cylindrical bearing sleeve 19 in which is journaled the spindle 20 of a rotary cutter 21 which may be in the form of a grinding or milling tool. The upper end of spindle 20 projects above the bearing sleeve 19 and head 15 and is of polygonal form as indicated at 22. This polygonal end portion 22 of spindle 20 is fitted and secured within a similarly shaped socket 23 provided on one end of a flexible shaft 24 so as to provide a detachable driving connection between said flexible shaft and said spindle. The flexible shaft 24 is connected at its other end to the drive shaft 25 of an electric motor 26 mounted upon the upper shelf portion of the motor support 8. It will thus be seen that the tracer point 17 and cutter 21 are mounted for a free or floating vertical movement. The frame 11 which carries the tracer point and cutter heads 14 and 15 is counterbalanced adjustably so that the pressure of the tracer point against the master model or pattern P may be regulated, and the counterbalancing means may consist of a vertically swinging arm 27 pivotally mounted as at 28 intermediate its ends upon the upper end of the upwardly extending portion of an angular bracket 29 attached to the motor support 8. The arm or lever 27 overlies the motor 26 and has its forward end connected to the tool bar 13 intermediate the ends of the latter as at 30, by means of a flexible member or link. Longitudinally adjustable on the other end of lever 27 is a counterweight 31.

In use, the pattern P and work W are secured upon the table 5 and the tracer point 17 and cutter 21 are lowered with the tracer point 17 near the left side of the pattern as viewed in Figure 3 and with the cutter 21 engaged with the work. As the table 5 is reciprocated and the attachment is fed transversely to the right of Figure 3, the work will be gradually cut away in accordance with the contour of the pattern followed by the tracer point 17. In following this contour, the frame 11 and parts carried thereby will have a free vertical floating movement. It will thus be seen that the cutter will operate upon the work for accurately reproducing or copying the pattern or master model.

With slight modification or by the use of a simple special bracket, the attachment may be applied to a grinding or milling machine, attachment being made to the bar of the machine instead of to the tool support of a printing machine as shown. By using a grinding tool instead of a milling tool at 21, the attachment can be used for finish grinding any irregular or regular surface automatically.

It will be seen that the present attachment is well adapted for carrying out the stated objects of the invention, and it will be appreciated that the invention is susceptible of minor changes in details of construction without departing from the spirit and scope of the invention as claimed.

What I claim as new is:

1. A copying attachment for planing or like machines, comprising a shelf bracket, means to secure said bracket to the tool support or like element of the machine, a frame pivoted at one end to the lower portion of said bracket for vertical floating movement, a transverse tool bar carried by the other end of said frame, spaced heads carried by said tool bar, a tracer point carried by one of said heads, a rotary cutter carried by the other head, means for driving said cutter including a motor mounted on said bracket and a flexible shaft connecting the drive shaft of said motor with said rotary cutter, said frame comprising a pair of spaced rigidly connected arms having parallel end portions, bearing screws threaded through said end portions, said bracket having side flanges provided with bearing recesses receiving said bearing screws.

2. A copying attachment for planing or like machines, comprising a shelf bracket, means to secure said bracket to the tool support or like element of the machine, a frame pivoted at one end to the lower portion of said bracket for vertical floating movement, a transverse tool bar carried by the other end of said frame, spaced heads carried by said tool bar, a tracer point carried by one of said heads, a rotary cutter carried by the other head, and means for driving said cutter including a motor mounted on said bracket and a flexible shaft connecting the drive shaft of said motor with said rotary cutter, said frame comprising spaced rigidly connected arms having forwardly diverging portions terminating in transversely alined split clamps, a transverse tool bar received by and gripped in said clamps, said heads having split clamps embracing and gripping said tool bar.

MORRIS L. SWIRE.